(12) United States Patent
Cantin

(10) Patent No.: US 8,989,416 B2
(45) Date of Patent: Mar. 24, 2015

(54) RECHARGEABLE IN-THE-EAR HEARING AID

(71) Applicant: STMicroelectronics (Tours) SAS, Tours (FR)

(72) Inventor: Frédéric Cantin, Tours (FR)

(73) Assignee: STMicroelectronics (Tours) SAS, Tours (FR)

(*) Notice: Subject to any disclaimer, the term of this patent is extended or adjusted under 35 U.S.C. 154(b) by 0 days.

(21) Appl. No.: 14/091,824

(22) Filed: Nov. 27, 2013

(65) Prior Publication Data

US 2014/0153759 A1    Jun. 5, 2014

(30) Foreign Application Priority Data

Dec. 3, 2012  (FR) ..................................... 12 61548

(51) Int. Cl.
*H04R 25/00* (2006.01)
*H01M 10/46* (2006.01)

(52) U.S. Cl.
CPC ............... *H04R 25/00* (2013.01); *H01M 10/46* (2013.01); *H01M 2220/30* (2013.01)
USPC ............ 381/323; 381/322; 381/328; 381/331

(58) Field of Classification Search
CPC ........ H04R 25/00; H04R 25/55; H04R 25/60; H04R 25/65; H04R 25/558; H04R 25/602; H04R 2225/25; H04R 2225/31; H04R 2225/33
USPC ........................... 381/315, 322–324, 328, 331
See application file for complete search history.

(56) References Cited

U.S. PATENT DOCUMENTS

| | | | |
|---|---|---|---|
| 4,379,988 A * | 4/1983 | Mattatall | 381/323 |
| 5,216,402 A | 6/1993 | Carosa | |
| 6,265,100 B1 | 7/2001 | Saaski et al. | |
| 6,310,960 B1 | 10/2001 | Saaski et al. | |
| 6,636,017 B2 | 10/2003 | Zink et al. | |
| 6,658,124 B1 | 12/2003 | Meadows | |
| 7,003,353 B1 | 2/2006 | Parkhouse | |
| 8,344,689 B2 | 1/2013 | Boguslavskij | |
| 2002/0113572 A1 | 8/2002 | Zink et al. | |
| 2009/0010462 A1 | 1/2009 | Ekchian et al. | |
| 2009/0067652 A1* | 3/2009 | Schmidt et al. | 381/323 |
| 2014/0153759 A1 | 6/2014 | Cantin | |
| 2014/0254844 A1 | 9/2014 | Shennib et al. | |

FOREIGN PATENT DOCUMENTS

| | | |
|---|---|---|
| EP | 0552738 A1 | 1/1993 |
| EP | 1942570 A1 | 7/2008 |
| FR | 2793638 A1 | 11/2000 |

OTHER PUBLICATIONS

French Search Report and Written Opinion dated Aug. 27, 2013 from corresponding French Application No. 12/61548.

* cited by examiner

*Primary Examiner* — Suhan Ni
(74) *Attorney, Agent, or Firm* — Allen, Dyer, Doppelt, Milbrath & Gilchrist, P.A.

(57) ABSTRACT

An object containing electronic circuits and a rechargeable cell, wherein the cell is arranged close to a surface of the object, a charge coil being shiftable with respect to the cell between an operating position where it is arranged around the cell and a recharge position where it is axially offset with respect to the cell.

9 Claims, 1 Drawing Sheet

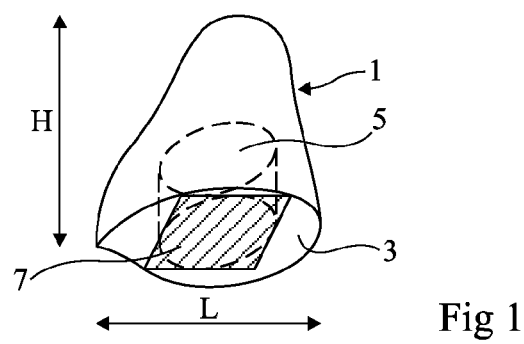
Fig 1
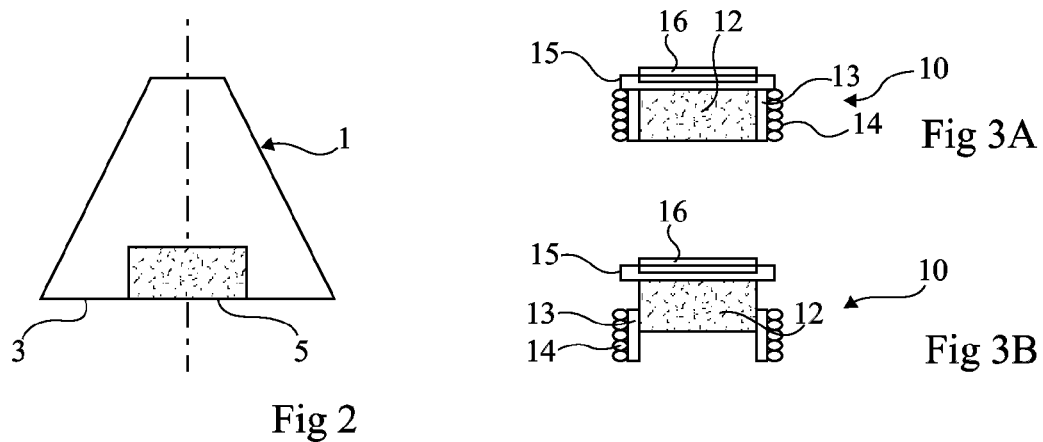
Fig 2
Fig 3A
Fig 3B
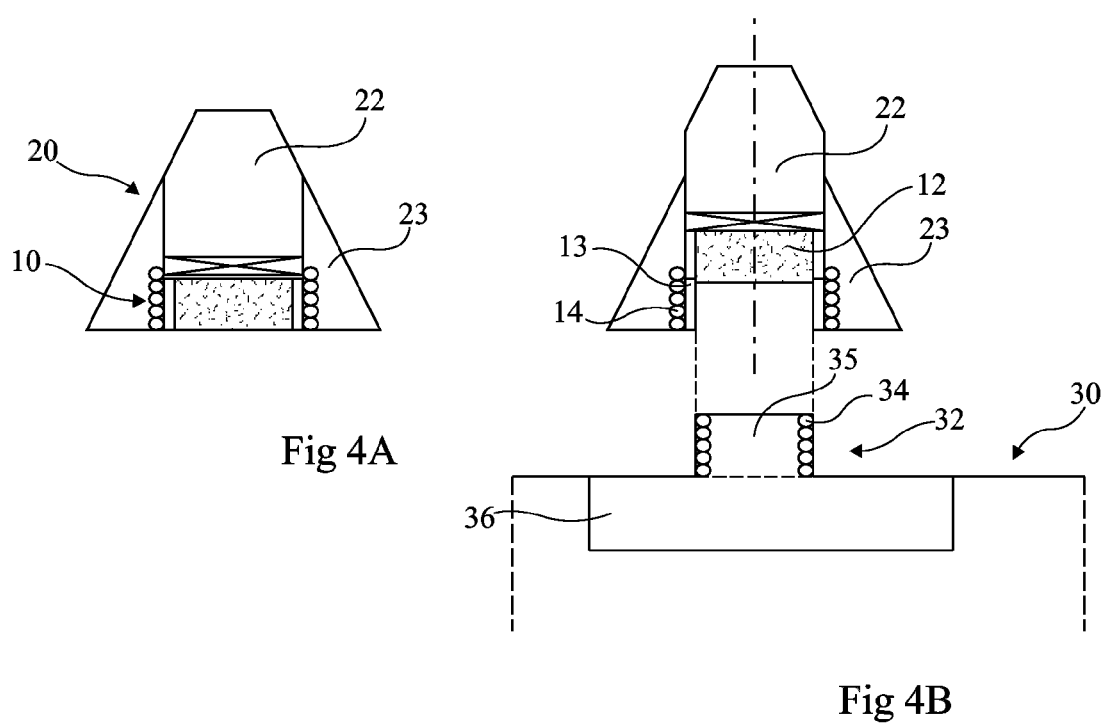
Fig 4A
Fig 4B

RECHARGEABLE IN-THE-EAR HEARING AID

CROSS REFERENCE TO RELATED APPLICATIONS

This application claims the priority benefit of French Patent Application No. 12/61548, filed Dec. 3, 2012, and which application is hereby incorporated by reference to the maximum extent allowable by law.

BACKGROUND

1. Technical Field

The present disclosure relates to an object of small dimensions (on the order of one centimeter) containing electronic circuits powered by a cell. It more specifically relates to such an object containing a rechargeable cell having a non-negligible power consumption, the cell having to be able to provide an energy greater than 8 milliamperes-hour to offer 12 hours of autonomy. The present disclosure especially applies to in-the-ear hearing aids.

2. Discussion of the Related Art

The general appearance of an in-the-ear hearing aid is illustrated in FIG. 1. Such a hearing aid has an anatomic shape capable of being inserted in the external auditory canal. Generally, hearing aid 1 comprises a substantially planar surface 3 which, once the hearing aid has been inserted into the auditory canal, faces outwards. Preferably, for aesthetic reasons, the hearing aid is sized to avoid substantially protruding from the auditory canal. Such a hearing aid contains various electronic circuits for receiving, amplifying, adapting, and retransmitting sound signals, adapted to the hearing impairment which is desired to be overcome. Such electronic circuits have to be powered. Accordingly, a cell 5, inserted on the side of surface 3 in a cavity closed by a shutter 7, is provided.

An in-the-ear hearing aid has small dimensions. Calling H its largest dimension such as indicated in FIG. 1, conventional values of H range between 12 and 18 mm. The largest lateral dimension L approximately ranges from 8 to 12 mm. As a result, only cells of small dimensions may be inserted in such a device, for example a cell having a diameter ranging between 4 and 8 mm for a height ranging between 2 and 5 mm, for example, a cell having a 5.5-mm diameter and a 4-mm height. Further, such hearing aids have a relatively high power consumption, greater than 0.5 milliamperes in average, that is, in practice, with non-rechargeable cells, an autonomy on the order of one week at best can be reached, which results in a very high cell replacement cost. Further, when a rechargeable cell is used, the device power consumption results in that, with a rechargeable cell having the above-indicated dimensions, a recharge has to be provided practically every night. Thus, a user who would nevertheless like to use a rechargeable cell should, every day (against once a week for a disposable cell), perform a cell removal operation, an operation of recharge thereof, and an operation of putting back the cell in place. Given the small cell dimensions, these operations are delicate, and this all the more as persons using a hearing aid often are elderly people having a limited visual acuity and dexterity. Mechanical devices for grabbing the cell, placing it on a charger, and putting it back in place have thus been provided. Such devices are, however, not always very easy to use, especially for elderly people. Further, such operations cause a fouling of electric contacts.

This problem of handling a small rechargeable cell is posed for hearing aids such as indicated hereabove, but also for many other devices of small dimensions with a relatively high power consumption, such as swallowable cells that may correspond to pills having a diameter approximately ranging from 6 to 8 mm, and generally for any device which is desired to be tight.

It should be noted that the above-mentioned problem of frequent change or of frequent recharge of cells of small dimensions is not posed for devices such as watches which have a very low power consumption and for which the lifetime of a cell may approximately range from 1 to 5 years. On the other hand, this problem is not posed either for devices of relatively large dimensions, such as watches or devices having the format of a credit card, for which a surface area is available, which is sufficient to have charge coils of relatively large diameter (several centimeters), which, despite a generally poor coupling with a primary, enable to provide a sufficient power due to their number of turns and to their diameter.

There thus is a need for an electric object provided with a rechargeable cell which does not need being extracted from the object in order to be recharged.

SUMMARY

Thus, an embodiment provides an object containing electronic circuits and a rechargeable cell, wherein the cell is arranged close to a surface of the object, a charge coil being shiftable with respect to the cell between an operating position where it is arranged around the cell and a recharge position where it is axially offset with respect to the cell.

According to an embodiment, the object has a maximum dimension smaller than 20 mm, the cell being cylindrical and having a diameter smaller than 6 mm and a height smaller than 4 mm.

According to an embodiment, the object forms an in-the-ear hearing aid.

According to an embodiment, the charge coil is fixedly attached to the body of the object and the cell is shiftable away from the above-mentioned surface.

According to an embodiment, a portion of the object located above the cell opposite to the above-mentioned surface is shiftable along with the cell with respect to the body of the object.

According to an embodiment, the object comprises ratchet means for maintaining the object in operating position.

According to an embodiment, the object comprises locking means for preventing said portion of the object from sliding beyond the recharge position.

An embodiment provides a system for recharging an object such as hereabove, comprising a pad supporting, around a ferromagnetic core, a winding having an external diameter corresponding to the internal diameter of the charge coil.

According to an embodiment, the pad comprises means for heating the cell.

The foregoing and other features and advantages will be discussed in detail in the following non-limiting description of specific embodiments in connection with the accompanying drawings.

BRIEF DESCRIPTION OF THE DRAWINGS

FIG. 1, previously described, schematically shows an in-the-ear hearing aid;

FIG. 2 is a still more simplified representation of a small object containing a rechargeable cell;

FIGS. 3A and 3B show a rechargeable cell system, respectively in operating position and in recharge position; and FIGS. 4A and 4B show a small object provided with a system of the type described in relation with FIGS. 3A and 3B in operating position and in recharge position.

DETAILED DESCRIPTION

FIG. 2 is an extremely simplified cross-section view of a small object provided with a rechargeable cell. This small object is illustrated in the form of a frustum. As in FIG. 1, the small object is designated with reference numeral 1. One of its surfaces, having the rechargeable cell mounted thereon, is designated with reference numeral 3 and the rechargeable cell is designated with reference numeral 5. It should be noted that surface 3 does not necessarily have a planar surface and that the simplified frustum shape of FIG. 2 is only illustrated to simplify the drawings. The small object may have any desired shape, for example, a shape of the type in FIG. 1 for a hearing aid, or even a capsule shape for a swallowable pill provided with electronic means for analyzing internal organs of the body and/or medication. It will then for example be an object having a spherical or ellipsoidal shape.

FIGS. 3A and 3B show an assembly 10 of a cell and of its charge system, respectively in operating position and in recharge position. It is provided to replace rechargeable cell 5 of FIGS. 1 and 2 with an assembly 10 such as illustrated in FIGS. 3A and 3B. Assembly 10 comprises a cell 12 surrounded with a ring 13 around which is wound a coil 14. This coil is connected by connection elements 15 to a charge circuit 16. Ring 13 with coil 14 is shiftable along the axis of cell 12. Given that, as will be seen hereafter, assembly 10 is mounted in an object in a particularly simple and easy-to-use way, it may be provided for rechargeable cell 12 of assembly 10 to be frequently recharged. Cell 12 may conveniently have dimensions slightly smaller than those of cell 5 illustrated in FIGS. 1 and 2, so that assembly 10 occupies substantially the same volume as cell 5.

Assembly 10 may take one or the other of two configurations. In a first configuration illustrated in FIG. 3A, which corresponds to an operating position, coil 14 is arranged around the rechargeable cell. In a second configuration illustrated in FIG. 3B, which corresponds to a recharge position, coil 14 is shifted along the axis of the rechargeable cell so that its internal portion is accessible. Connection elements 15 connect the terminals of coil 14 across charge circuit 16. Thus, such connection elements must remain efficient in the two positions illustrated in FIGS. 3A and 3B. They will for example be fold-out wires, flexes, or rail and cursor systems.

Charge circuit 16 corresponds to conventional circuits known in the art intended to rectify an A.C. signal provided by coil 14 when it is coupled to a primary winding and to carry out various regulation functions intended to provide an optimal charge of a rechargeable cell. It may also integrate a conversion of the battery output voltage (such as a voltage step-down circuit), which offers more choice as to the battery technology and to its associated voltage. Such known circuits may be contained within a wafer 16 having a thickness on the order of 1 mm and a diameter which is not greater than that of the cell, that is, from 5 to 8 mm.

As indicated, the possibility of a relative translation motion between cell 12 and charge circuit 16, on the one hand, and the assembly of ring 13 and of coil 14, on the other hand, is provided. It may be provided for the assembly of the rechargeable cell and of circuit 16 to be fixed with respect to the body of object 1. In this case, the assembly of the ring and of the coil must be pulled towards the outside to a recharge position, for example, by means of a small tab or of any other means for grasping coil 14. In the recharge position illustrated in FIG. 3B, a primary winding connected to a system for providing an A.C. current is inserted into ring 13 to provide power to winding 14 which then forms a secondary winding. It should be noted that the primary winding, due to its hollow cylindrical shape, may easily contain a cylindrical ferrite core having a diameter slightly smaller than that of the primary coil. Such a core provides a very good coupling between the two coils, even at low frequencies, and does not interfere with the operation of assembly 1 (in particular with its microphone and its loudspeaker) when it is removed from its recharge base.

FIGS. 4A and 4B illustrate an embodiment of the recharge system. A small object 20 is divided into two main portions shiftable with respect to each other. The first portion comprises cell 12 and circuit 16 for charging a system 10 such as previously described, topped with a block 22, for example, especially comprising all the electronic circuits of object 20. This first portion is surrounded with a second portion 23. First portion 22 is mobile with respect to second portion 23 between a position, illustrated in FIG. 4A, where the object has its "normal" operating shape, and a recharge position, illustrated in FIG. 4B, where the first portion is shifted upwards while ring 13 and winding 14 remain fixed with respect to second portion 23. Locking and/or ratchet means, not shown, are preferably provided to ascertain that each of the portions illustrated in FIGS. 4A and 4B is stable.

As very schematically shown in FIG. 4B, to switch to the recharge position, object 20 is arranged above a charge system 30 comprising a protruding pad 32 provided with a winding 34 wound around a ferrite core or another ferromagnetic material 35 having object 20 bearing against it to have the first portion slide with respect to the second portion. Charge system 30 conventionally comprises electronic circuits 36 capable of supplying coil 34 with an A.C. current to transfer power into coil 14 once the two windings 14 and 34 have been placed in front of each other.

To return to the normal operating position, it is sufficient to lay the object, the cell facing downwards, on a substantially planar surface and to press on the top of portion 22 (or conversely).

It should be noted that charge system 30 may also comprise in its upper portion a heating element for heating rechargeable cell 12 during its recharge. Indeed many types of rechargeable batteries, such as lithium metal batteries recharge much faster when their temperature is higher than the usual temperature, for example, when their temperature approximately ranges from 40 to 50° C.

It should be understood that many variations may be brought to the device described herein without departing from the field of the invention. For example, instead of providing a coil assembled on a ring, an autonomous coil, for example, a coil embedded in a resin, may be provided.

Charge systems such as system 30 of FIG. 1 may be formed from many existing devices, for example, devices generally associated with laptop computers.

Further, although this has not been described, it should be clear that connections should be provided between the cell, the recharge circuit, and the various electronic circuits contained in the object.

Such alterations, modifications, and improvements are intended to be part of this disclosure, and are intended to be within the spirit and the scope of the invention. Accordingly, the foregoing description is by way of example only and is not intended to be limiting. The invention is limited only as defined in the following claims and the equivalents thereto.

What is claimed is:

1. An article comprising:
a body containing electronic circuits and a rechargeable cell coupled thereto, wherein the rechargeable cell is arranged close to a surface of the body;
a charge coil being shiftable with respect to the rechargeable cell between an operating position where it is arranged around the rechargeable cell and a recharge position where it is axially offset with respect to the rechargeable cell; and
a charge circuit carried by the rechargeable cell and shiftable with the rechargeable cell with respect to the charge coil.

2. The article of claim 1, having a maximum dimension smaller than 20 mm, the rechargeable cell being cylindrical and having a diameter smaller than 6 mm and a height smaller than 4 mm.

3. The article of claim 1, wherein the body, electronic circuits, rechargeable cell and charge coil form an in-the-ear hearing aid.

4. The article of claim 1, wherein the charge coil is fixedly attached to the body and the cell is shiftable away from a surface of the body.

5. The article of claim 4, wherein the charge circuit is located above the cell opposite to a surface of said body and shiftable along with the cell with respect to the body.

6. The article of claim 5, comprising a ratchet configured to maintain the body in an operating position.

7. The article of claim 5, comprising a lock configured to prevent the charge coil from sliding beyond the recharge position.

8. The article according to claim 4, comprising a pad supporting a ferromagnetic core, and a winding having an external diameter corresponding to an internal diameter of the charge coil.

9. The article of claim 8, wherein the pad comprises a coil for heating the cell.

* * * * *